Figure 17:
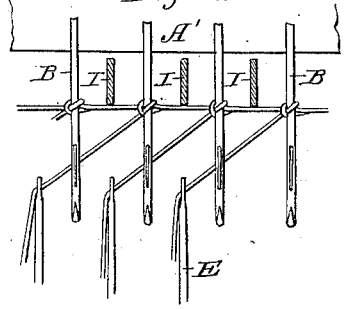
Figure 18:
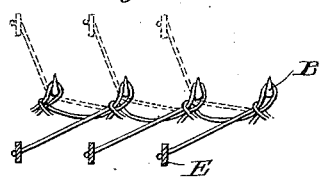

(No Model.) 7 Sheets—Sheet 1.
C. YOUNG.
KNITTING MACHINE.
No. 302,810. Patented July 29, 1884.
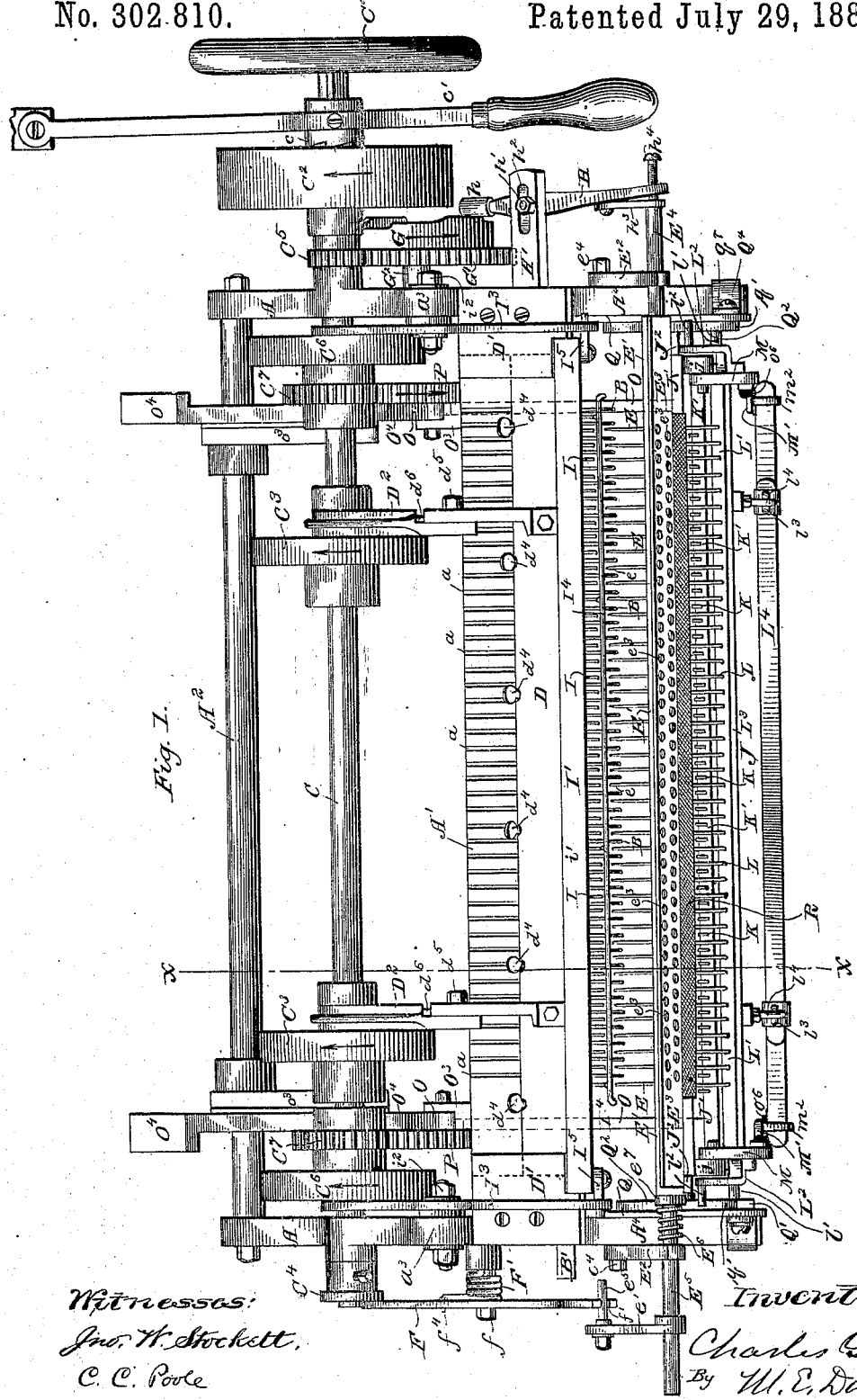
Fig. I.
Witnesses:
Jno. W. Stockett,
C. C. Poole
Inventor:
Charles Young
By M. E. Dayton
Attorney (No Model.) 7 Sheets—Sheet 2.
C. YOUNG.
KNITTING MACHINE.
No. 302,810. Patented July 29, 1884.
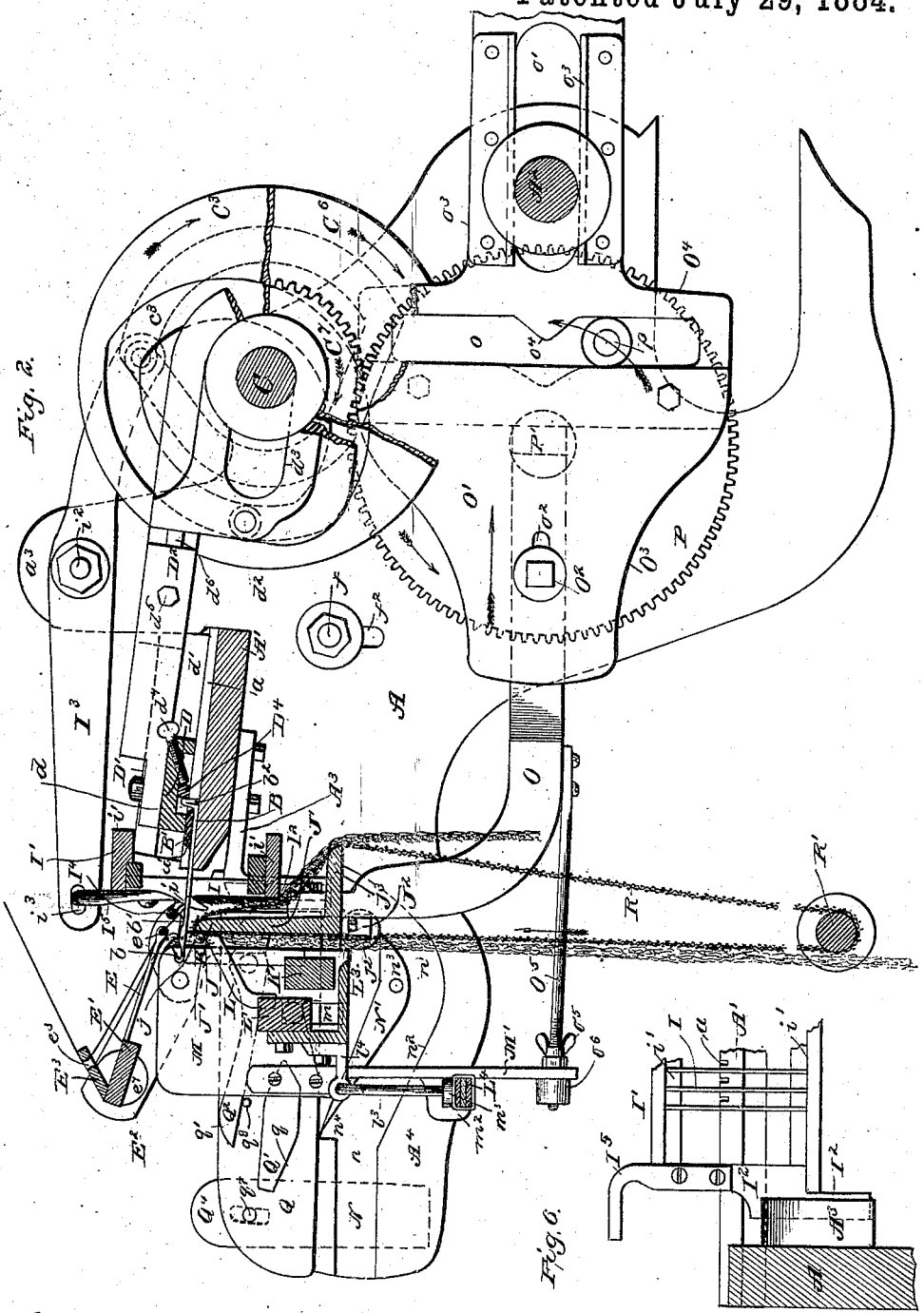
Witnesses.
Jno. W. Stockitt,
C. C. Poole
Inventor.
Charles Young
By M. E. Dayton
Attorney.
N. PETERS. Photo-Lithographer, Washington, D. C.

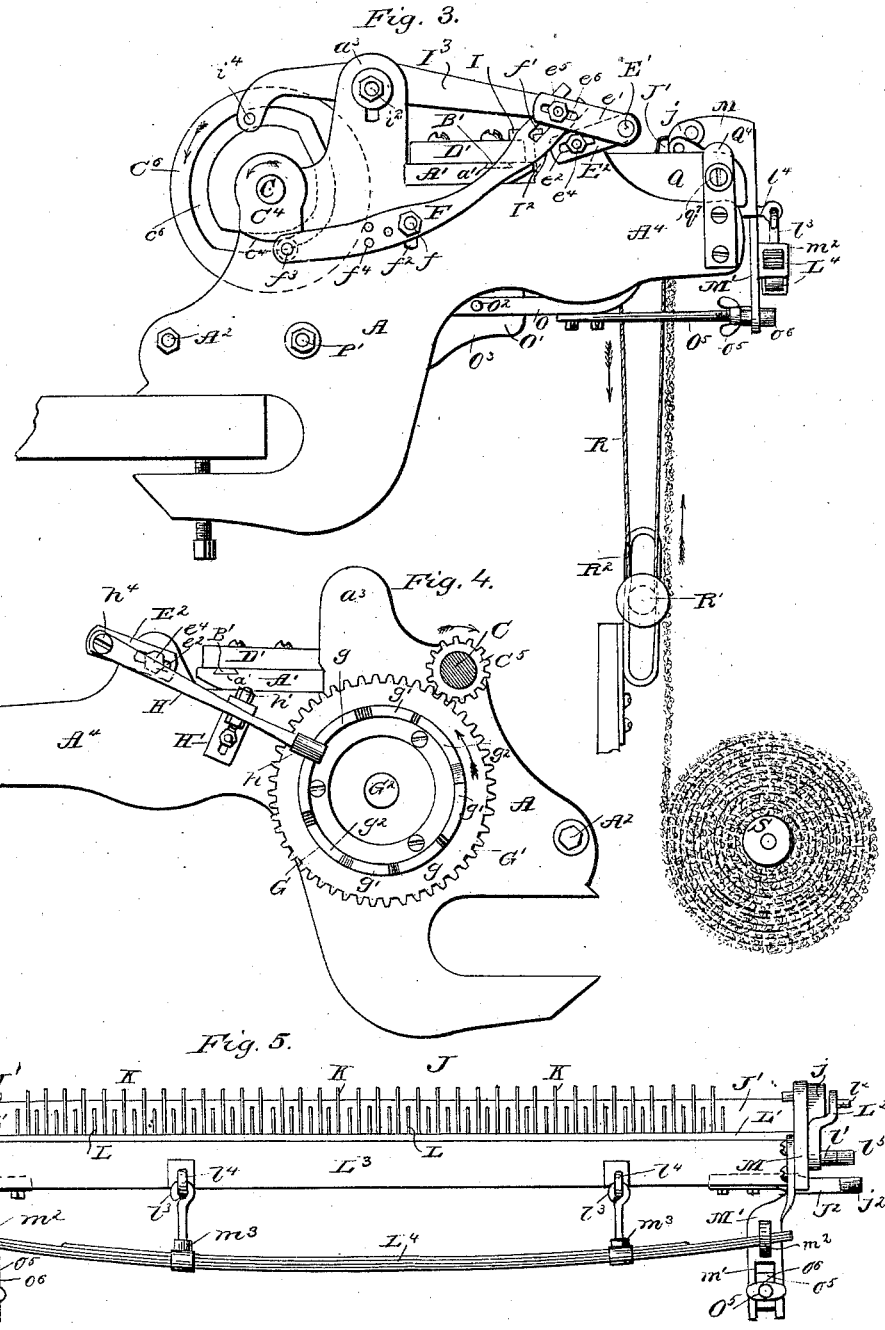

(No Model.) 7 Sheets—Sheet 4.
C. YOUNG.
KNITTING MACHINE.
No. 302,810. Patented July 29, 1884.
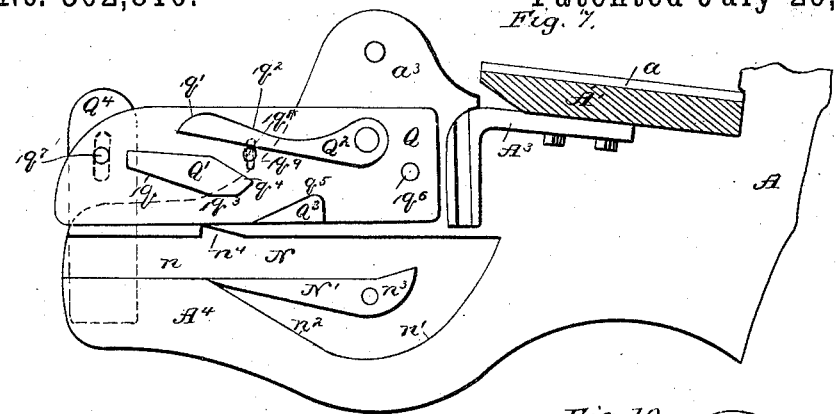
Witnesses
Jno. W. Stockett
C. C. Poole
Inventor
Charles Young
By M. E. Dayton
Attorney (No Model.) 7 Sheets—Sheet 5.
C. YOUNG.
KNITTING MACHINE.
No. 302,810. Patented July 29, 1884.
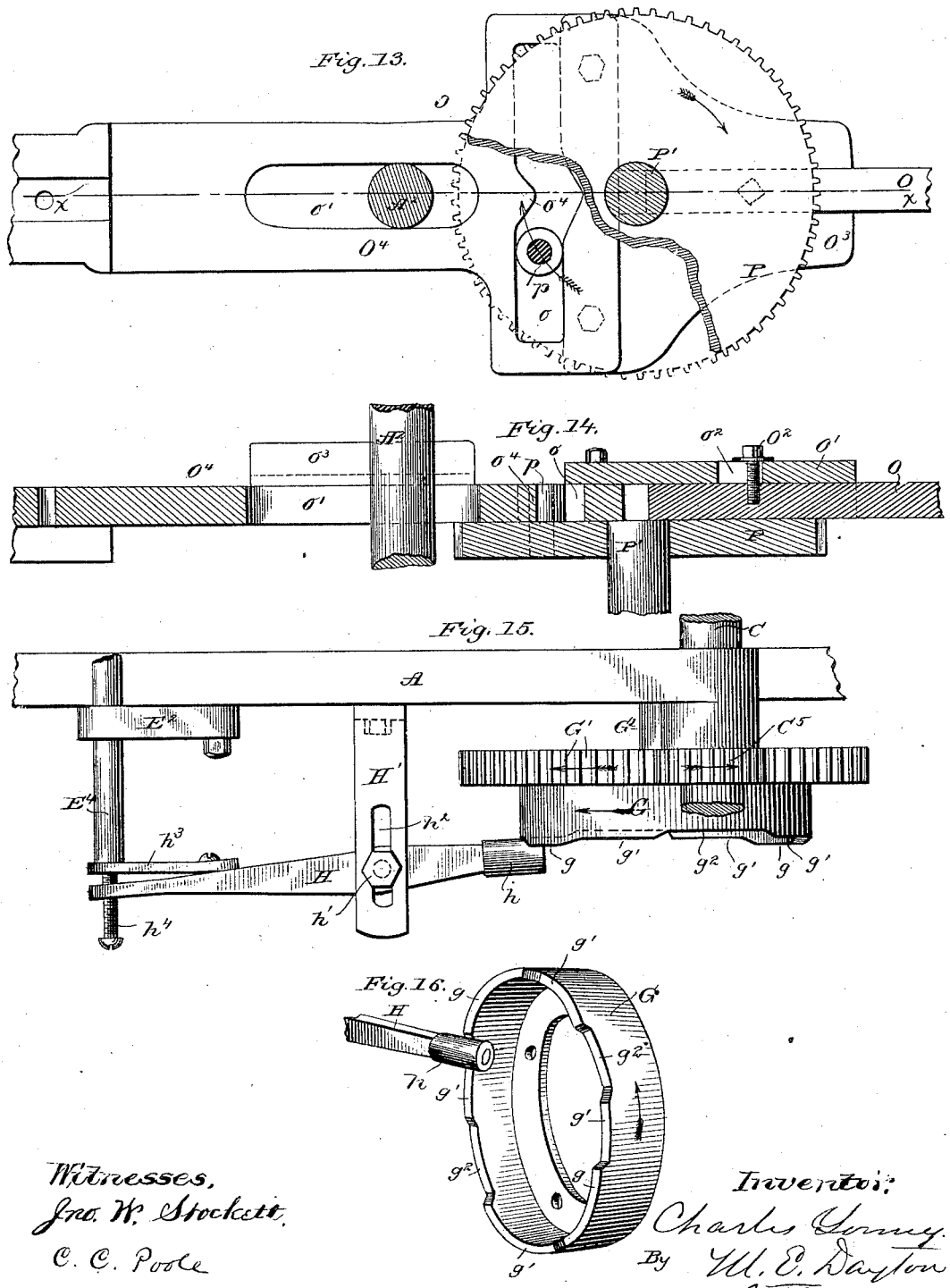

(No Model.)

7 Sheets—Sheet 6.

C. YOUNG.
KNITTING MACHINE.

No. 302,810. Patented July 29, 1884.

Witnesses.
Jno. W. Stockett.
C. C. Poole

Inventor:
Charles Young
By M. E. Dayton
Attorney (No Model.) 7 Sheets—Sheet 7.
C. YOUNG.
KNITTING MACHINE.
No. 302,810. Patented July 29, 1884.
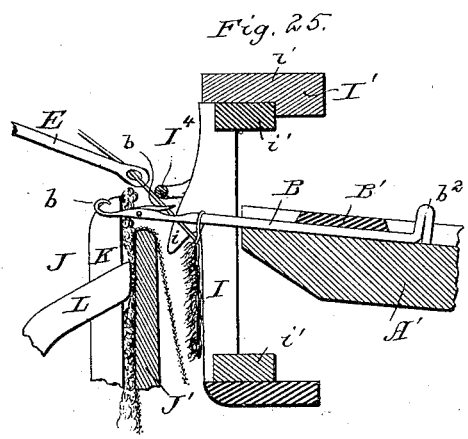
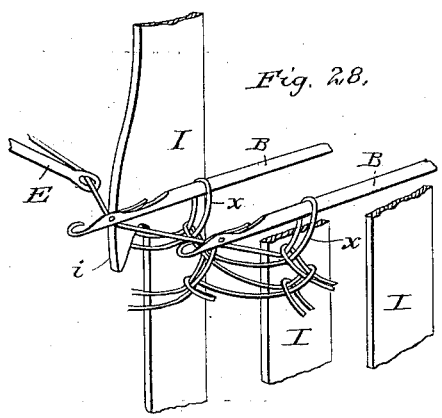
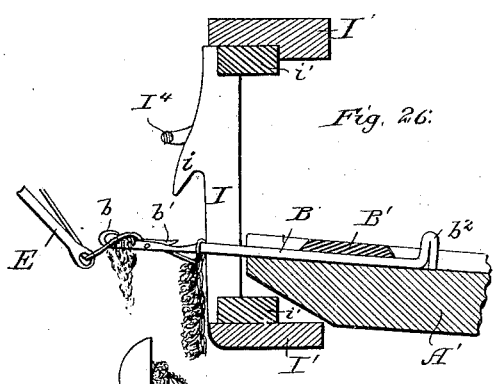
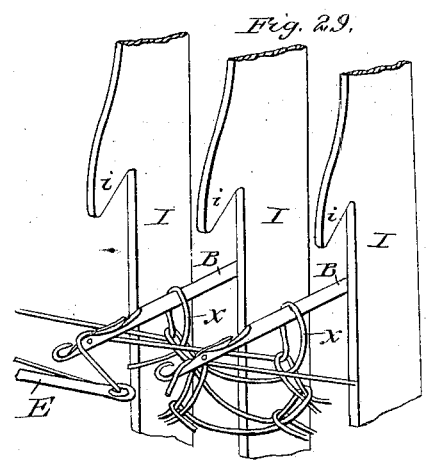
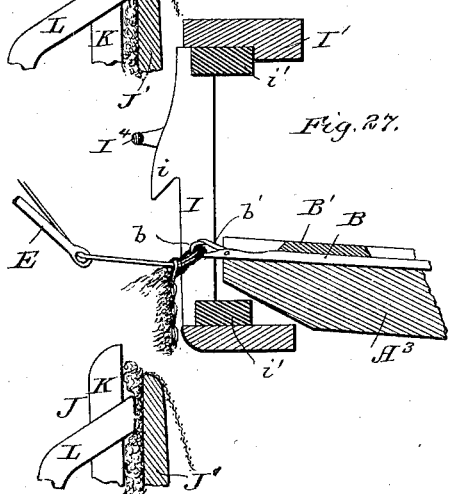
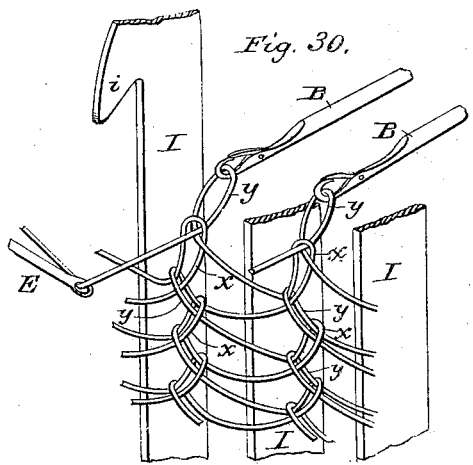
Witnesses.
Jno. W. Stockett
C. C. Poole
Inventor
Charles Young
By M. E. Dayton
Attorney

UNITED STATES PATENT OFFICE.

CHARLES YOUNG, OF CHICAGO, ILLINOIS, ASSIGNOR, BY DIRECT AND MESNE ASSIGNMENTS, TO FRANK E. CRAIN AND WARREN B. WILSON, BOTH OF SAME PLACE.

KNITTING-MACHINE.

SPECIFICATION forming part of Letters Patent No. 302,810, dated July 29, 1884.

Application filed November 24, 1882. (No model.)

*To all whom it may concern:*

Be it known that I, CHARLES YOUNG, a resident of the city of Chicago, in the county of Cook and State of Illinois, have invented certain new and useful Improvements in Knitting-Machines; and I do hereby declare that the following is a full, clear, and exact description thereof, reference being had to the accompanying drawings, and to the letters of reference marked thereon, which form a part of this specification.

A principal object of the invention is to provide a machine for producing a fleeced fabric by securing in the body of a knitted fabric loose or untwisted fibers of cotton, wool, or other substance during the process of knitting the same.

To this end the invention consists in the combination, with the mechanism of a knitting-machine, of means for automatically feeding a quantity of fibers to the needles of such machine in such manner that the said fibers will be drawn into and incorporated with the knitted fabric during the formation thereof.

In addition to the matters above mentioned, the invention consists in improvements in the knitting mechanism of that class of machines in which the knitted fabric is produced from a series of threads, and in which a single series of reciprocating latched needles and a single series of oscillating and laterally-reciprocating thread-carriers are used.

The fleece or fiber feeding device illustrated in the accompanying drawings is adapted to operate in connection with any knitting mechanism having a straight row of needles. The knitting device in connection with which it is shown is of that class using reciprocating needles having hooked ends and latches, and a series of threads and thread-carriers corresponding in number to the needles, and commonly known as "warp knitting-machines." The operation of the fleece-feeding devices is substantially the same, however, when used with single-thread machines having similar needles. The essential part of the operation of forming the stitch in the class of machines mentioned is very simple, and may be briefly described (referring to one needle) as follows:

The needle mentioned being in an advanced position, the latch thrown back, the hook open, and a previously-formed loop upon the shank thereof, the thread is placed by the carrier in the open hook and the needle retreated, whereby the old loop is drawn forward, causing it to close the latch upon the hook, and then to slip over the end of the needle and over the new loop, thus discharging the old loop from the needle and forming a new loop in the hooks thereof. Upon the next advance movement of the needles such new loop is slipped backward, so as to open the latch and pass over it and upon the shank of the needle, and at the termination of such advance movement the needle is in an advanced position, with a new loop upon its shank, and with its hook in readiness to receive the thread for another stitch, which is formed in the same manner. In the machine shown, in which a series of threads and thread-carriers is used, the operation of the needles in forming the stitches is the same, the several threads being carried laterally by a reciprocating motion of the thread-carriers, so that each thread forms a loop first upon one needle and then upon the adjacent one, these loops being drawn through the loops of the adjacent threads, first upon one side and then upon the other, in a well-known manner, and as will be hereinafter more fully described. The fleece-feeding device shown is intended to operate with a flat web of carded wool, cotton, or other fibers; and it consists, essentially, of a reciprocating fleece-carrier provided with gripping-jaws placed parallel with the needles, and constructed to hold a web of fleece the width of the article to be produced near the edge thereof. The carrier mentioned is provided with feeding mechanism for advancing the fleece as fast as it is deposited upon the needles, and is moved, in connection with the movement of the needles, in such a manner that when the said needles are advanced preparatory to forming a new set of loops, as before described, the ends of the said needles pass through the portion on the fleece projecting from the jaws of the carrier, such portion of the fleece being hooked upon the needles and carried with the new loop through the old one when the needles retire in forming the next stitch, and the fleece-carrier being moved away from the needles, so as to separate the portion hooked upon the needles from that in the carrier, either before or after the portion so caught upon the needles is drawn through the old loops, as will be hereinafter more fully described.

In the accompanying drawings, Figure 1 is a plan view of a machine embodying my invention. Fig. 2 is a vertical cross-section of the same, taken upon line $x\,x$ of Fig. 1. Fig. 3 is an end view of the same, looking toward the right in Fig. 1. Fig. 4 is a view of the end opposite to that shown in Fig. 3, looking toward the left in Fig. 1, the pulley and clutch devices being removed. Fig. 5 is a front elevation of the fleece-carrying device detached from the machine. Fig. 6 is a fragmentary view showing one end of the sinker-bar and a portion of the machine-frame in section. Fig. 7 is a detail view of the cam-plates for operating the fleece-carrier, together with adjacent parts of the frame. Fig. 8 is a detail view of the fleece-carrier. Fig. 9 is a horizontal detail sectional view of one end of the fleece-carrier, taken upon line $x\,x$ of Fig. 8. Figs. 10, 11, and 12 are detail views illustrating the operation of the fleece-carrier. Fig. 13 is a detail view of the device for reciprocating the fleece-carrier. Fig. 14 is a horizontal section taken upon line $x\,x$ of Fig. 13. Fig. 15 is a detail plan view of the cam for reciprocating the thread-carriers. Fig. 16 is a detail perspective view of the same. Figs. 17, 18, 19, 20, 21, 22, 23, and 24 are diagrams illustrating the action of the needles and thread-carriers in forming the stitch. Figs. 25, 26, and 27 are sectional diagrams illustrating the operation of the fleece-carrier in depositing the fleece upon the needles. Figs. 28, 29, 30 are detail perspective views illustrating the operation of the needles, the thread-carriers, and the sinkers in forming the stitch.

As shown in the drawings, the main frame of the machine, upon which the several operative parts are mounted, consists of two end plates, A, a longitudinal bed-plate, A', rigidly secured at its ends to said plates A, and a girt, $A^2$, connecting the said end plates at the rear of the bed-plate. The bed-plate A' is preferably arranged in a slightly-inclined position, with its lower portion toward the rear, and is provided on its top surface with a series of transverse grooves, $a$, in which are placed a series of needles, B, constructed in a well-known manner with hooked ends $b$, latches $b'$, and upturned ends or heels $b^2$. The hooked ends of the needles B project from the front side of said plate, and said needles are reciprocated, in the operation of the machine, in a manner hereinafter described.

C is the main driving-shaft of the machine, which is located at the rear of and parallel with the bed-plate A', and has bearings in the end plates, A. The said shaft is shown as provided upon one end with a hand-wheel, C', and a driving-pulley, $C^2$, the latter being loosely mounted upon the said shaft, and connected with it by a clutch device, indicated as a whole in the drawings by $c$, which is operated by a hand-lever, $c'$, whereby the said shaft may be readily connected with and disconnected from the driving-pulley.

Upon the shaft C, near the ends of the bed-plate A', are secured two cam-plates, $C^3$, by which the needles B are reciprocated. The said needles are placed in the grooves $a$ in the bed-plate A, with their transversely-bent ends or heels $b^2$ in a vertical position and projecting above the surface of the said plate. The said grooves are made of somewhat greater depth than the thickness of the shanks of the needles, and the latter are held therein by a strip, B', secured in a longitudinal groove, $a'$, in the surface of the bed-plate, near its front edge, the lower surface of said strip being on a line with the upper surfaces of the shanks of the needles, so that the said needles are held securely in the grooves, and at the same time permitted to slide freely therein when reciprocated. The strip B', as shown, is of dovetailed form in cross-section, and the groove $a'$ is of corresponding shape, the said strip being inserted into the groove from the end of the bed-plate in an obvious manner. The several heels $b^2$ of the needles B, which project above the surface of the bed-plate A, as before described, are constructed to engage a groove, $d$, in the lower face of a laterally-reciprocating plate or needle-bar, D, resting upon the top surface of said bed-plate, which is connected to and operated by the cam-plates $C^3$ upon the shaft C, by which cam-plates the needles are reciprocated at the proper time with reference to the movements of the other operative parts of the machine, as will hereinafter be described.

As preferably constructed, the ends of the needle-bar D are held in grooves $d'$ in guide-plates D', secured upon the bed-plate A' at the end portions thereof, and the said needle-bar is connected with the cam-plates $C^3$ by means of arms $D^2$, bolted to said bar D, near each end thereof, and provided with roller-pins $d^2$, constructed to engage cam-grooves $c^3$ in the said cam-plates. The arms $D^2$ are held and guided at their rear ends, as shown, by means of slots $d^3$ therein, constructed to fit over the shaft C, and to slide upon said shaft when said arms are reciprocated. Means are shown for adjusting the length of the arms $D^2$ and the position of the needles with reference to the bar D, such adjustments being accomplished in a manner and for a purpose hereinafter set forth.

E is a series of thread-carriers, which correspond in number with the needles B, and are secured in a longitudinal bar, E', placed in front of and somewhat above the bed-plate A', and having bearings at its ends in arms $E^2$, adjustably secured to the end plates, A, of the machine. The thread-carriers E are provided at their ends with eyes $e$, to carry the threads, and the plate E' has secured to it an upwardly-projecting flange, $E^3$, having in it a series of guide-apertures, $e^3$, through which the threads are first led in passing from the bobbins, and from which they pass to the eyes $e$ of the thread-carriers. The arms $E^2$ are adjustably secured to the end plates, A, by means of bolts $e^4$, passing through longitudinal slots $e^2$ in said arms, as shown in Figs. 3 and 4, whereby the position of the bar E' may be varied with reference to the needles, as found desirable or necessary in adjusting the machine.

The ends of the several thread-carriers E in the machine shown are given both an oscillatory and a reciprocatory motion, so as to carry the threads alternately around each of two adjacent needles. For this purpose the ends of the carriers are oscillated vertically by the partial rotation of the bar E', so as to pass alternately above and below the needles, and are reciprocated laterally by an endwise movement of the bar E' in such manner that the eye of each carrier, as it is oscillated, will pass between two adjacent needles at each downward movement and outside of each of such adjacent needles in alternation in its upward movement, thereby describing a figure 8, and throwing a loop of thread first over one and then over the other of the two adjacent needles. For the purpose of giving the oscillating motion mentioned to the carriers E, the bar E', at one end of the machine, is provided with an arm, $e'$, and a lever, F, is pivoted by means of a stud, $f$, to the end plate, A, said lever being constructed to engage the said arm $e'$ at its forward end, and at its rear end a cam, $C^4$, upon the shaft C. The arm $e'$, as shown, is provided with a pin, $e^5$, adjustably secured in a slot, $e^6$, in said arm, said pin being constructed to operate in a slot, $f'$, in the end of the lever F. The stud $f$ is preferably secured in a slot, $f^2$, in the plate A, whereby it may be adjusted vertically, and is provided upon its end which engages the cam $C^4$ with a roller-pin, $f^3$, constructed to follow the edge of said cam as it rotates. For the purpose of retaining the said roller-pin in contact with the cam, a coiled spring, F', is placed around the stud $f$, one end of said spring being secured to the stud, and the other bent outwardly and placed in one of several apertures $f^4$ in the said lever, as shown. The cam $C^4$ is provided with a salient portion, $c^4$, extending over about one-fourth of its circumference, and constructed to throw the end of the lever F in contact therewith downward and the thread-carriers upward once during each rotation of the shaft C, and at the proper time with reference to the movement of the needles, as will be hereinafter explained.

The thread-carriers E are reciprocated laterally by means of a cam, G, and lever H, constructed and operating in a manner similar to the cam and lever shown in Letters Patent No. 209,786, granted to me on the 12th day of November, 1878. The cam G is preferably constructed in the form of a cylindrical ring with an annular cam-face upon its edge, and is secured upon the face of a spur-wheel, G', mounted upon a short shaft, $G^2$, secured in the end plate, A, as shown at the right hand of Fig. 1, and in Fig. 4, said spur-wheel being constructed to mesh with a pinion, $C^5$, upon the shaft C, by which it is rotated. The lever H is pivoted near its center upon a bracket, H', secured to the end plate, A, and is provided upon one end with a roller, $h$, which engages the edge of the cam G. The opposite end of the said lever rests against the projecting end $E^4$ of the bar E', said end $E^4$ being cylindrical, and constructed both to rotate and to slide longitudinally in its bearings in the arm $E^2$. The opposite end $E^5$ of the bar E' is also made cylindrical in form, for the same purpose, and upon such cylindrical portion $E^5$, between the inner face of the supporting-arm $E^2$ and a collar, $e^7$, secured upon the said bar, is placed a coiled spring, $E^6$, constructed, by its expansive action, to retain the end $E^4$ of the bar E in contact with the lever H. The pivot $h'$ of the lever H is, as shown, adjustably secured in a longitudinal slot, $h^2$, in the bracket H'; and in order to provide means for adjusting the end of the said lever with reference to the bar E', a plate, $h^3$, is attached to the said lever, its inner end being flexibly secured thereto, and its outer end being placed in contact with the end of the said bar, and supported by an abutting screw, $h^4$, passing through the end of the lever, whereby the distance of the outer end of the plate from the end of the lever may be varied as desired, and for the purpose above stated.

The face of the cam G, as shown more plainly in Figs. 15 and 16, consists of a series of plane faces or steps, $g$, $g'$, and $g^2$, arranged in equidistant planes transverse to the axis of the cam, such faces being connected by short inclines, as shown, so that the roller $h$ will pass easily from one face to another when the cam is rotated. The faces $g$, $g'$, and $g^2$ are placed at such distances apart that the lever H, in passing from one face to another, will move the bar E' and the thread-carriers E a distance equal to the interval between two needles, or so that a thread-carrier which is opposite the space between two needles will be moved to a point opposite the next space. The cam shown is constructed to give two complete lateral reciprocations to the thread-carriers at each revolution thereof, and is provided with two faces $g$ at diametrically opposite points, for holding the thread-carriers at one limit of their movement, which in the machine shown is that at the left hand, two faces $g^2$, for holding the carriers at the opposite limit of their movement, and four intermediate faces, $g'$, for holding the carriers in an intermediate position. The circumference of the pinion $C^5$ in the machine shown is one-fourth of that of the spur-wheel G', so that the latter wheel and the cam G are rotated four times to each rotation of the shaft C. The thread-carriers E are given one complete oscillation to each rotation of the shaft C by means of the cam C⁴, as before described, and the said cam C⁴ and the cam G are relatively so placed that the movement of the carriers in each direction, when oscillated, takes place during the time that the roller h is traversing one of the faces g, g', or g² of the cam G. In order to cause the thread-carriers to throw the thread first around one needle and then around the adjacent one in the operation of the machine, as before described, the upward oscillatory movement of the thread-carriers is arranged to take place at the time that they are at the extreme limits of their lateral movement, and the downward oscillatory movement at the intermediate point therein, or when a particular carrier is between the two adjacent needles, around which it passes in forming the loops. In order to accomplish the lateral and oscillating movements of the thread-carriers in the order described, the cam C⁴ is constructed to operate the bar E', in connection with the cam G, in a manner which may be more readily understood by referring to Figs. 15 and 16 and to the diagrams, Figs. 17 to 24, and which is as follows: When the several carriers are at the extreme limit of their movement to the left, as indicated in Fig. 17, the roller h is resting upon the face g of the cam G. The said cam is rotated in the direction of the arrows, Figs. 15 and 16, and during the time that the roller h is traversing the face g the thread-carriers are thrown upwardly by the cam C⁴ to the position indicated by dotted lines in Fig. 18, and the said carriers are retained in such position by the said cam C⁴ until the roller h passes to the face g', and they are thereby moved laterally over one needle to the position shown in Figs. 19 and 20. During the passage of the roller h over the cam-face g', the carriers are thrown downwardly between the needles by the action of the cam C⁴ to the position shown in dotted lines in Fig. 20, and the said roller then passing to the face g², the said carriers are moved laterally under the needles to the position shown in Figs. 21 and 22. While the roller is traversing this face the carriers are again thrown upward, as indicated in dotted lines, Fig. 22, and said roller passing to the face g', they are moved laterally back to their intermediate positions, Figs. 23 and 24, and then downward to the position shown by dotted lines in Fig. 24, and by the passage of said roller to the face g again back to the extreme limit of their movement and the point first mentioned. The movement of the carriers last described takes place during one-half the revolution of the cam G, and serves to make two stitches, the thread by such movement being carried first around the needle to the right and then around the needle to the left of the intermediate position of the carrier.

Figure 19:
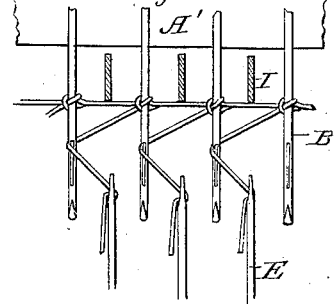
Figure 20:
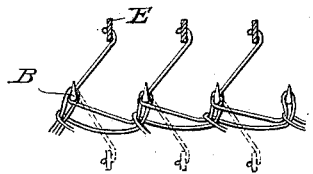

The cams C³, by which the needles are reciprocated, are so arranged with reference to the cams C⁴ and G, by which the thread-carriers are actuated, that the needles are moved to the rear while the thread-carriers are in their intermediate position after having carried the thread around the needles, the roller h at such time being upon one of the intermediate faces, g', of the cam G, and the thread-carriers at the lower limit of their movement, as indicated in Fig. 19 and in dotted lines in Fig. 20. The advance movement of the needles takes place during the time that the thread-carriers are at the extreme limit of their movement in either direction, and when the roller h is upon one of the cam-faces g or g² the thread-carriers being at the lower limit of their movement, and in the position shown in Figs. 17, 18, 21, and 22. By the rearward movement of the needles mentioned, the threads thrown over the needles by the thread-carriers, as indicated in Fig. 19 and in dotted lines in Fig. 20, are drawn through the loops (x, Fig. 30) which are upon the shanks of the needles, and new loops (y, Fig. 30) are thereby formed, which latter are slipped back upon the shanks of the needles in the next forward movement thereof in a well-known manner. Such advance movement takes place after the thread-carriers have been moved laterally under the needles to the position shown in Figs. 17, 18, 21, and 22, so that they will be in position to engage the threads upon the next movement of the carriers to the position indicated by dotted lines in Figs. 18 and 22.

Figure 21:
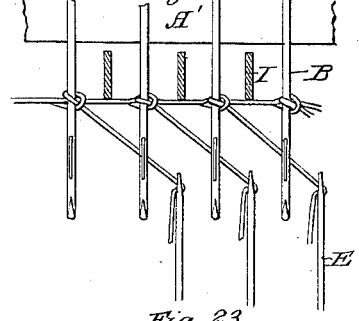
Figure 22:
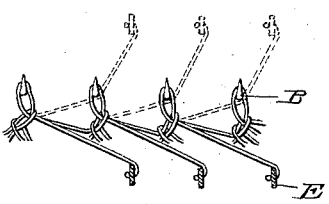
Figure 23:
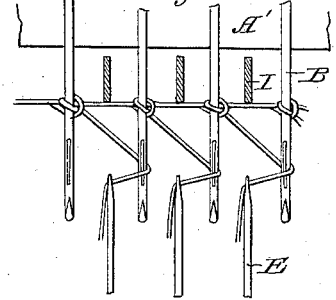
Figure 24:
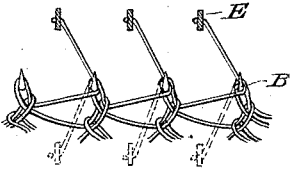

The several needles shown in the diagrams, Figs. 17 to 24, are indicated as in an advanced position, Fig. 19 representing their position immediately before they are retired to form the loop, and Fig. 21 their position immediately after they have been again advanced, a new loop, as clearly indicated in Fig. 22, having been formed upon the needles at the left hand, and the several threads being extended from each loop beneath the needles at the right to the thread-carriers preparatory to the formation of another set of loops on the needles last mentioned.

For the purpose of holding the top edge of the fabric being formed during the operation of making the stitches, so that the new loops shall be thrown backward out of the hooks and upon the shanks of the needles in the forward movement thereof, a series of vertical and vertically-movable strips or sinkers, I, are placed between the projecting ends of the needles B and in front of the bed-plate A'. The said sinkers are attached to a horizontal sinker-bar, I', said bar consisting of two vertically-separated parallel strips, i', rigidly connected at their ends, in which the said sinkers are secured at their upper and lower ends. The vertical front edges of the several sinkers I are so placed with reference to the needles that the hooks b, when the said needles are at the limit of their rearward movement, are drawn to the rear of the said front edges, as illustrated in Figs. 27 and 30 of the drawings, whereby the loops held upon the shanks of the needles are drawn forward and over said hooks as the needles are retired. Upon the front edges of the sinkers I are formed downwardly and forwardly inclined hooked projections $i$, the purpose of which is to hold the upper edge of the fabric stationary during the forward movement of the needles, and to thereby draw the loops formed in the hooks $b$ backwardly upon the needle-shanks during such forward movement.
In order to cause the said hooks $i$ to engage the upper edge of the fabric during the forward movement of the needles, and to retire so as to be out of the way at the time of the formation of the next stitch, means are provided for moving the sinker-bar I' vertically at each reciprocation of the needles. As illustrated in the drawings, the devices for supporting and operating the said sinker-bar are constructed as follows: The bars $i'$, composing the said sinker-bar, are attached at their ends to vertical guide-pieces $I^2$, which slide in guide-grooves formed in guide-pieces $A^3$, secured to the bed-plate A, as shown more plainly in Figs. 2 and 6. The said sinker-bar is moved vertically by means of pivoted levers $I^3$, engaged with cam-plates $C^6$ upon the driving-shaft C, the said levers $I^3$ being pivoted to upwardly-projecting portions $a^3$ of the end plates, A, by means of pivot-bolts $i^2$, and connected with the sinker-bar I' by means of vertical arms $I^5$ upon said sinker-bar, which are bent horizontally at their upper ends and inserted in slots $i^3$ in the ends of the said levers. The levers $I^3$ are constructed to engage the cam-plates $C^6$ by means of roller-pins $i^4$ upon their rear ends, which move in cam-grooves $c^6$ in the said cam-plates. The cam-grooves mentioned are formed with two concentric portions arranged at different distances from the axis of the cam, the concentric portion farthest from the axis extending through an arc of about one-third of the circumference of the cam, so that the sinker-bar is retained at the lower limit of its movement during about one-third of the rotation of the shaft C.
In order to accomplish the proper relative movements of the needles and the sinkers, as before described, the cam-plates $C^6$, by which the latter are operated, are so placed with reference to the cam-plates $C^3$, by which the needles are reciprocated, that the sinker-bar is thrown down at or about the time that the needles begin their forward movement, and are retained in such position by the roller-pins $i^4$, moving in the concentric portion of the grooves $c^6$, during the time the needles are advancing and until they are about to begin their rearward movement. The relative position of the cam-grooves $c^3$ and $c^6$ is illustrated in Fig. 2, the cam-groove $c^6$ being indicated in said figure in dotted lines, and the several parts in the position held by them after the needles have been advanced and at the moment before the sinker-bar is lifted.
The operation of the needles, the thread-carriers, and the sinkers in forming the stitches is illustrated in the series of Figs. 25 to 30.

In Figs. 25 and 28 the several parts are represented as in the same position as indicated in Fig. 2, the needles B being in an advanced position, the thread-carriers E at the extreme limit of their movement to the left, and the sinkers at the lower limit of their movement and about to rise. A previously-formed loop, Fig. 28, is shown upon the shank of the needle B, and the thread is shown as drawn by the thread-carrier from the previously-formed loop on the adjacent needle to the right beneath and partially around the needles first mentioned, as indicated in Fig. 17 and in dotted lines in Fig. 18. In Figs. 26 and 29 the sinker I has been raised, and the thread-carrier has been moved to the right and downward to the position indicated in Fig. 19 and in dotted lines in Fig. 20, the thread being drawn around the needle and in the hook thereof, as shown. In Figs. 27 and 30 the needles are shown as drawn back, the old loops $x$ upon the shanks of the needles having been held stationary by the sinkers, so as to be drawn forward on the needles, such loops in the rearward movement of the needles having caught beneath the latches $b'$, so as to close said latches upon the ends of the hooks $b$ in a well-known manner, and the said hooks having been caused to draw the thread held thereon through the said loops, so as to form a series of new loops, $y$, as indicated in said Fig. 27 and in Fig. 30. The needles being in the position shown in Figs. 27 and 30, the continued movement of the machine throws the sinkers down and the needles forward into the advanced position, the threads of the fabric intermediate to the loops being held by the hooks $i$ of the sinkers, so as to draw the loops $y$ backwardly out of the hooks $b$ and into the position indicated in Figs. 25 and 28, such backward movement of the loops upon the needles serving to throw back the latches $b'$, and to thereby leave the hooks $b$ open to receive another loop in the formation of the next stitch in a well-known manner. The thread-carrier E, at the conclusion of the operation of making one stitch, as shown in Fig. 30, is at a point centrally between the two needles shown in that figure, and in the position shown in dotted lines, Fig. 20. The thread in the hook of the left-hand needle in Fig. 30 having been formed into a new loop upon said needle, the next movement of the said carrier will be to the right and around the needle shown at the right-hand in said figure, the next thread-carrier at the left at the same time making a new loop upon the left-hand needle, which is drawn through the loop $y$ thereon, and which forms another loop corresponding to the loop first mentioned, as illustrated in Figs. 21, 22, 23, and 24. In the process of forming the fabric there is, of course, a thread thrown around each needle at each movement of the carriers, as shown clearly in Figs. 17 to 24, and each thread thereby takes a zigzag course, first around one needle and then around the adjacent one, the opposite loops of the thread being drawn through and interlocked with those of the adjacent threads, as clearly shown by the enlarged view of the fabric shown in Figs. 28, 29, and 30.

It is found in practice that the latches $b'$ of the needles B are liable, in the forward motion of the needles, to spring forward at the moment the loops leave their ends in passing backwardly over said latches to the said needle-shanks, thereby closing the hooks $b$, and preventing the said hooks from catching the thread when it is thrown around the needles in making the next series of loops. Such failure of the hook to catch the thread will of course result in a failure of the needle to make a stitch, and in order to remedy this defect a rod, $I^4$, is placed in front of the sinkers I and above the needles, said rod being so located that when the needles are in an advanced position it will be a short distance from and above the ends of the latches, and in such position that if any of the said latches fly upwardly or forwardly in the advance movement of the needles, as before described, they will be arrested by said bar and thrown backward to their proper positions. The rod $I^4$ is preferably secured to the projections or hooks $i$ of the sinkers I at several points, as shown in Figs. 1 and 25; but said rod may be attached to the sinker-bar in any other convenient or desirable manner. Said rod $I^4$, by being attached to and moving with the sinker-bar, as described, is brought down into its proper position to arrest the latches during the forward movement of the needles, (which movement takes place at the time that the sinkers are at the lower limit of their movement, as before stated,) and is moved upwardly and away from the needles at the time of their backward movement, so as to allow the latches to close, when the old loops are discharged over the hooks of the needles.

The fleece-feeding device shown in the drawings as operating in connection with the knitting mechanism hereinbefore described consists, essentially, of a laterally-reciprocating fleece-carrier, designated as a whole by the letter J, which is arranged parallel with and in front of the bed-plate A', and is constructed to hold a flat web or fleece of wool or other fibers near the upper straight edge of such web, and to deposit fibers from the projecting portion of such fleece upon the hooked ends of the needles, so that the fibers thereby placed upon the needles will be drawn into the fabric with the thread-loops during their formation.

It is contemplated, in the use of the fiber-feeding device above referred to, to place the fleece-fibers upon the needles either at every stitch or at every second, third, or other stitch, as may be found desirable in forming the fabrics of different kinds, or in making a fleeced fabric with a greater or less thickness or quantity of fleece upon its surface. The device shown in the drawings is constructed to feed the fleece to the needles at every alternate stitch; but such device may be modified, so as to feed at every stitch or at other intervals, as hereinafter set forth.

The fleece-carrier J embraces, as shown in the drawings, a vertical guide-plate or fleece-plate, J', and forming therewith the opposing parts or jaws, between which the edge of the fleece is held, a series of vertical guide fingers or strips, K, secured in a bar, K', and placed in front of and parallel with the plate J', and a series of vertically and laterally movable feed-fingers, L, secured to a bar, L', placed parallel with the plate J' and K' and in front of the latter, said fingers being bent at their upper ends and arranged to pass between the series of strips K. The fleece is guided in the vertical space between the plate J' and the fingers K, and is held therein by being clamped between the face of the said plate J' and the ends of the feed-fingers L, which project through and between the guide-fingers K, as above stated. The guide-fingers K project somewhat above the upper edge of the fleece-plate J', and are placed at the same distance apart as the needles B of the knitting mechanism and opposite the spaces between the said needles. The fleece is held between the fleece-plate J and the guide-fingers K, with its upper edge projecting above the upper edge of the said fleece-plate and in contact with the upwardly-projecting ends of the guide-fingers, and the fleece-carrier is so supported with reference to the needles that when it is moved horizontally toward the bed-plate A the hooked ends of said needles will pass over the upper edge of the fleece-plate and between the upper end of the guide-fingers, thus piercing the upper edges of the fleece held between the said plate and the said fingers, as clearly shown in Figs. 2 and 25. Mechanism is provided for lowering and withdrawing the fleece-carrier after the needles have pierced the edge of the fleece-web, so as to leave a quantity of fleece-fibers therefrom hooked upon the needles, as hereinafter described.

After the removal of a portion of the fibers from the projecting edge of the fleece-web, as described, it is necessary to feed the said web upwardly, so as to present a new portion thereof above the fleece-plate for the entrance of the needles at the next approach of the carrier thereto. For this purpose, in the machine shown in the drawings, a four-motion feed device is used, means being provided for moving the ends of the feed-fingers L first backward from the fleece, Fig. 10, then downward, Fig. 11, then forward, so as to again clamp the fleece against the fleece-plate, Fig. 12, and then upwardly to their original position, the fleece being held by it in contact with the fleece-plate and guide-fingers during the time the feed-fingers are withdrawn, and carried upwardly by the said feed-fingers until its edge projects a sufficient distance above the fleece-plate. Any suitable feed device other than that described may be used—as, for instance, an intermittently-revolving cylinder provided with points or projections arranged to engage the fleece and carry it upward.

As a preferable construction in the several devices for operating the fleece-carrier and feed-fingers, they are made as follows: The guide-finger bar K′ and the feed-finger bar L′ are supported at their ends in plates M, which are pivoted at their upper ends to brackets $j$, secured to the ends of the fleece-plate J′, the object of such construction being to allow the feed-fingers and guide-fingers to be swung upwardly and away from the fleece-plate J′, so as to permit the insertion of the web of fleece-fibers between the fleece-plate and the said fingers preparatory to the operation of the machine. The bar K′ is rigidly secured to the plates M; but the bar L′ is provided upon its ends with cylindrical extensions or bearing-pins $l'$, which pass through vertical slots $m$ in said plates, and are constructed to move vertically and also to rotate in said slots.

The fleece-carrier J is supported upon the machine-frame by arms J², secured to the ends of the fleece-plate J′, said arms being provided with anti-friction rollers $j^2$ upon their ends, which enter cam-grooves N in the inner faces of forwardly-projecting portions A⁴ of the end plates A of the machine, as shown. The said cam-grooves are constructed to cause the fleece-carrier (which is reciprocated by devices operated from the driving-shaft C, as hereinafter described,) to move in a horizontal line in its approach to the needles, to drop a short distance vertically after the fleece has been engaged by the needles, and then to rise to its original position in its retreat from the needles. For this purpose each of such cam-grooves has an upper horizontal portion, $n$, extending from the front end of the projection A⁴ to a point beneath the front edge of the bed-plate A′, the lower bearing-surface at the rear portion of said groove $n$ being formed by the upper surface of a pivoted dog, N′, which is constructed to support the rollers $j^2$ in the approach of the fleece-carrier to the needles until they reach the point at which the downward movement of said carrier takes place. The portion of the frame-plate A⁴ below the dog N′ is cut away, as shown, so as to form a downwardly and forwardly curved bearing-surface, $n'$, beneath the rear end of the said dog, upon which surface the roller $j^2$ rests after leaving said rear end of the dog, such bearing-surface being continued in an upwardly-inclined surface, $n^2$, intersecting the lower bearing-surface of the groove $n$ near the forward end thereof. The forward end of the pivoted dog N′ rests at the point of intersection of the surface $n^2$ with the lower bearing-surface of the groove $n$, and is constructed to rise so as to permit the roller $j^2$ to pass from said incline $n^2$ to the groove $n$, as more clearly shown in Figs. 2 and 7. The pivotal point of the dog N′, as shown, is placed a short distance forward of its rear end, and the forward end of the said dog being free to rise for the purpose before stated, when the roller $j$ passes to the rear of said pivotal point, the weight of the carrier acts to throw the rear end of the dog downwardly and the forward end upwardly from its normal position. In order to prevent the descent of the carrier in this movement of the dog, and to retain it in its horizontal path at such time, the rear portion, $n^3$, of said dog is inclined upwardly at such an angle that when the dog is tilted, as described, the upper surface of the portion $n^3$ will be horizontal and in line with the lower bearing-surface of the portion $n$ of the cam-groove, as shown in Fig. 2. The upper surface of the groove $n$ is shown as cut away or notched at $n^4$, in order to permit the amount of vertical movement in the forward end of the dog N′ requisite to permit the roller $j^2$ to pass freely from the incline $n^2$ to the groove $n$.

The means shown in the drawings for reciprocating the fleece-carrier J consists of two arms, O, attached to said fleece-carrier, and provided with transverse slots $o$, which are engaged with roller-pins $p$ upon spur-wheels P, constructed to mesh with pinions C⁷ upon the driving-shaft C. The wheels P are mounted upon short journals P′, secured to the inner faces of the end plates, A, below the shaft C, as shown, the inner ends of the said journals being flush with the face of the wheels, as shown in Fig. 14. The slots $o$ are formed in yokes O′, secured to the arms O, and provided in the rear portions with guide-slots $o'$, which fit over and slide upon the rear girt, A², of the machine-frame. The wheels P are located at some distance below the fleece-carrier, and the arms O are curved upwardly from their points of connection with the yokes O′ and bolted to the ends of the fleece-plate J′, the said fleece-plate, as shown, being provided with a horizontal rearwardly-projecting flange, $j^3$, upon its lower edge for the purpose of giving to it the requisite rigidity. The arms O, as shown more clearly in Figs. 13 and 14, are adjustably secured in grooves in the yokes O′ by means of bolts O², which pass through slots $o^2$ in said yokes, whereby the said arms may be moved longitudinally in said grooves, and the position of the fleece-carrier thereby varied with reference to the needles, as may be found necessary in adjusting the machine for operation.

The yoke O′, as shown in the drawings, is composed of overlapping plates O³ and O⁴, secured together by bolts, the slots $o$ and $o'$ being formed in the latter plate and the arm O secured to the former one. This construction is merely incidental to the machine shown, and does not affect the operation of the device. Flanges $o^3$ are also shown as secured to the edges of the guide-slot $o'$, so as to form a broad bearing upon the girt A². Such flanges may obviously be dispensed with and other well-known construction in said guide-slots used instead. The plates O⁴ are shown as provided with grooves and bolt-holes, in order to afford means for attachment of rearwardly-extending arms, which may be secured thereto for the purpose of supporting weights to counterbalance the weight of the fleece-carrier, and to thereby take its weight from the arms $J^2$, so that said arms may be moved more easily in the cam-grooves N when the carrier is reciprocated. The slot $o$, in which the roller-pin $p$ operates, is preferably provided at its central portion with an outwardly or forwardly curved or deflected portion, $o^4$, such construction being for the purpose of accelerating the rearward motion of the fleece-carrier at the moment before it reaches the extreme limit of its throw toward the needles, so that the rollers $j^2$ will be drawn quickly from the end of the dog $N'$, and the carrier thereby allowed to drop rapidly away from the needles. The operation of such curved portion $o^4$ of the slot $o$ is illustrated more clearly in Fig. 2, in which the fleece-carrier is shown in the position held by it after the needles have pierced the fleece and at the moment before it begins its downward movement.

The roller $j^2$ in Fig. 2 is shown upon the extreme end of the portion $n^3$ of the dog $N'$, and the roller-pin $p$ in its position when about to enter the curved portion $n^4$ of the said slot, the said pin at such time moving upwardly in the slot, and the wheel P being rotated in the direction of the arrow. The further motion of the roller-pin will obviously throw the fleece-carrier quickly backward, so as to release the rollers $j^2$ from the dog, and thus permit the carrier to descend until said rollers encounter the cam-surface $n'$. The accelerated movement of the fleece-carrier mentioned is timed to take place at the moment after the sinker-bar $I'$ has begun to rise and before the needles begin their backward movement, so that the hooks $i$ upon the sinkers (which are shown in Fig. 2 as in position opposite the upper edge of the fleece-plate $J'$) are moved upwardly by the action of the cam-slot $c^6$ upon the lever $I^3$ in time to permit the top of the fleece-plate to pass below them, as will be readily perceived by observing the position in the cam-groove $c^6$ of the pin $i^4$ upon the lever $I^3$, as indicated in dotted lines in said Fig. 2.

The spur-wheels P and $C^7$ are so proportioned in the machine shown as to cause the fleece-carrier to approach the needles at every other stitch; or, in other words, the fleece-fibers are deposited upon the needles at every alternate advance movement thereof. In order to provide means for depositing the fleece-fibers upon the needles at every stitch, it is only necessary to make the wheels P and the pinion $C^7$ of the same diameter, in which case the wheel P will be caused to rotate once to each rotation of the shaft C, and a full reciprocation of the fleece-carriers will take place at every complete movement of the needles. In order to deposit the fleece at every third or other stitch, the speed of the wheel P may obviously be varied, so as to give the proper relative movement to the fleece-carrier, the operation of the fleece carrying and feeding devices in all cases being the same.

As a means of securing the plates M, which are pivoted to the ends of the fleece-plate $J'$, as before described, in operative position with reference to said plate, depending arms $M'$ are attached to the outer edges of said plates M, said arms being removably and adjustably connected at their lower ends with rods $O^5$, secured to the arms O. Slots $m'$ are formed in the lower ends of the arms $M'$, as shown, in which slots the threaded ends of the rods $O^5$ are inserted, thumb-nuts $o^5$ being placed upon the said rods behind said arms, and nuts $o^6$, having two flat sides, upon the rods in front of the arms. The slots $m'$ mentioned are made of sufficient width to pass over the said nuts $o^6$ when the latter are turned with their flat sides in vertical position, the arms $M'$ being secured to the rods $O^5$ by turning the said nuts $o^6$ transversely across the slots $m'$, as shown in Fig. 5.

The feed-motion previously described is preferably given to the feed-fingers L by the action upon the ends of the bar $L'$, to which said fingers are attached during the reciprocatory motion of the fleece-carrier, of a series of stationary cam-surfaces upon the machine-frame. As preferably constructed, such cam-surfaces are formed upon plates Q, secured to the inner faces of the projections $A^4$, above the cam-groove N, as shown more clearly in Fig. 7. The bar $L'$ is provided with cylindrical ends or pins $l'$, which project through slots $m$ in the plates M, as before described, and which are preferably provided upon their ends with rollers $l^5$, as shown. A vertical motion is given to said bar $L'$ by the engagement of the said pins $l'$ with one set of cam-surfaces upon the plates Q, and a rotary movement is given thereto by the engagement of pins $l^2$ upon the ends of rearwardly-projecting arms $L^2$, attached to said pins $l'$ outside of the plates M, Figs. 8 and 9, with a second set of cam-surfaces upon the said plates. In the construction shown, the bar $L'$ is secured by bolts to an angle-bar, $L^3$, for the purpose of giving to it the requisite rigidity, and said bar is retained normally at the upper limit of its vertical movement by means of a leaf-spring, $L^4$, held at its ends in eyes $m^2$ upon the arms $M'$, and acting upon the bar $L'$ through the medium of short braces $l^3$, pivotally connected with arms $l^4$ upon the angle-bar $L^3$, and resting at their lower ends in cups $m^3$ upon the said spring, as shown more clearly in Fig. 5. By applying the pressure of the spring $L^4$ to the ends of the arms $l^4$, as described, such spring not only tends to retain the bar $L'$ at the upper limit of its movement, but it also tends to rotate the the said bar so as to cause the ends of the feed-fingers to press against the fleece-plates, as shown in Fig. 2. The bar $L'$ is moved downwardly in opposition to the action of the spring $L^4$ by means of rearwardly and downwardly inclined cam-surfaces $q$, formed upon projections $Q'$ on the plates Q, which are encountered by the pins $l'$ upon said bar in the movement of the fleece-carrier toward the needles, and the ends of the feed-fingers are thrown backwardly or away from the fleece-plate J' by the action of the pins $l^2$ upon upwardly and rearwardly inclined surfaces $q'$ upon dogs $Q^2$, pivoted at their rear ends to the plates Q, and supported at their front ends upon pins $q^8$, secured in the said plates. The pin $l^2$ is arranged to encounter the surface $q'$ before the pin $l'$ strikes the surface $q$, so that the feed-fingers will first be moved away from the fleece-plate, and then thrown downwardly, as illustrated in Fig. 10, in which the feed-fingers are shown as thrown backwardly, so as to release the fleece, the pin $l^2$ being at the top of the inclined surface $q'$, as indicated by dotted lines in said figure. In Fig. 11 the feed-fingers are shown at the downward limit of their movement, the pin $l'$ having traversed the incline $q$, and the feed-fingers having been retained in their rearward position during the downward movement of the bar by the engagement of the pin $l^2$ with the inclined surface $q^2$ upon the dog $Q^2$, said inclined surface being parallel with the surface $q$, as shown. The inclined surface $q$ of the projection Q' terminates at its lower and rear end in a short horizontal surface, $q^3$. (Shown more clearly in Fig. 7.) The movement of the pin $l'$ over the said horizontal surface while the pin $l^2$ is at the same time moving downwardly upon the incline $q^2$ permits the feed-fingers L to approach the fleece-plate, so as to again grip the fleece, as shown in Fig. 12. The horizontal cam-surface $q^3$ terminates in a short upward incline, $q^4$, over which the pin $l'$ passes after leaving the surface $q^3$ in the continued motion of the fleece-carrier, thus permitting the bar L' and the fleece-fingers to return, by the action of the spring $L^4$, to their original position, as indicated in Fig. 2. At each complete movement of the feed-fingers, as described, the fleece is released, gripped at a lower point, and raised along the fleece-plate, the edge of said fleece in such movement being advanced or fed forward through distance equal to the vertical movement of the feed-fingers. A second projection, $Q^3$, may be formed upon the plate Q at the rear of the projection Q', said projection being provided with an upwardly-inclined cam-surface, $q^5$, for the purpose of lifting the bar L' in case the spring $L^4$ fails to throw the said bar upwardly with promptness. In the return or outward movement of the fleece-carrier the pins $l'$ and $l^2$ move diagonally upward in paths parallel with the surface $n^2$ upon which the roller $j^2$ of the fleece-carrier travels during such movement, the pin $l'$, during the movement mentioned, passing below the projection Q', and the pin $l^2$ passing over such projection and lifting the free end of the dog $Q^2$, so as to pass above it. The vertical distance through which the feed-fingers L are moved by the contact of the pins $l'$ with the inclines $q$ is determined by the position of the lower portion of the said inclines, so that by moving the projections Q' vertically the distance that the fleece is fed forward at each movement of the feed-fingers may obviously be varied as desired. As a preferable means of varying the amount of motion in the feed-fingers, the plate Q is secured to the plate A by a pivot-pin, $q^6$, at its rear end, and is attached at its front end to a vertical bar or projection, $Q^4$, upon said plate by means of a screw, $q^7$, passing through a slot in said projection and inserted in a threaded aperture in said plate Q, so that the plate may be adjusted vertically and held in its adjusted position, and the lower portion of the incline $q$ thereby placed in any desired position with reference to the finger-bar L', for the purpose above stated.

For the purpose of adjusting the upper cam-surfaces, $q'$ and $q^2$, of the dog $Q^2$ with reference to the pin $l^2$ at the time the position of the cam-surface $q$ is changed in order to vary the feed, as above mentioned, the pin $q^8$, upon which the free end of the said dog is supported, is made vertically adjustable upon the plate Q. As shown in the drawings, Fig. 7, the said pin is secured in a slot, $q^9$, formed in the plate, by means of a nut placed upon its threaded shank, outside of the plate, said shank being smaller than the pin, so as to form a shoulder adapted to bear against the inner surface of the plate.

In order to facilitate the feeding of the fleece upwardly between the fleece-plate J' and the fingers K by the feeding device described, and to obviate any liability of the web of fleece to separate or break when drawn upwardly by the feed-fingers, a broad endless band or apron, R, of canvas or any other strong flexible fabric, is placed over and around the fleece-plate J'. The said apron is equal in width to the length of the fleece-plate, or to the fabric being formed, and the fleece—which is preferably supported upon a roller, S, placed at some distance below the fleece-carrier, as shown in Fig. 3—is carried upwardly against the outer face of said apron, the fleece and apron being moved forward together by the action of the feed-fingers. The endless apron R is thus caused to travel constantly around the fleece-plate; and in order to guide and steady the lower end thereof, a roller, R', is hung in its lower fold, as shown, such roller preferably being held in stationary guides $R^2$ at its ends, in order to prevent any swinging motion therein during the reciprocation of the fleece-carrier.

The relative position of the needles, the thread-carriers, the sinkers, and the fleece-carrier during the operations of feeding the fleece-fibers to the needles and drawing them through the loops of the fabric is illustrated in Figs. 25, 26, and 27. In Fig. 25 the several parts are in the position shown in Fig. 2, before described, the needles being advanced and engaged with the fleece held in the fleece-carrier. In Fig. 26 the fleece-carrier is shown as having been dropped, so as to leave a portion of fleece hanging upon the needles and in the hooks $b$ thereof, the thread which is to form the new loop having been thrown around the needle by the thread-carrier E, said thread lying in the hook thereof, together with the portion of the fleece mentioned. In Fig. 27 the needles are represented as having been moved backwardly and the new loops, (indicated by $y$ in Fig. 30,) together with the fleece hanging in the hooks of the needles, as drawn through the old loop ($x$, Fig. 30) and in readiness to slip back upon the shank of the needle in the next forward movement thereof, preparatory to the formation of another loop, as before mentioned.

By the operation described the portion of the fleece-fibers placed over the needles is gathered into the loops in the hooks thereof, and such loops of fiber are drawn through the preceding loops of the fabric with the thread-loops on the needles, the next succeeding series of loops of the fabric being drawn through the said loop of fiber and thread, so that the fibers of the fleece are knit into and incorporated with the fabric during its formation.

In the use of a fleece-fiber of long staple the obvious effect of the above-described movement of the fleece-carrier with reference to the needles (which may be described as a combing action) is to draw out from the mass of fleece only such long fibers as are hooked near their centers over the needles, so that such fibers will be secured in the fabric at their central portions, and the projecting ends thereof will form the fleece or nap upon the fabric. In the use of short and woolly or curled fibers, however, the fibers separated from the mass and hung upon the needles will cling together in masses or bunches, portions of which will be drawn into the fabric in an irregular manner; but as some portion of each fiber will usually form part of the loop carried into the fabric, such fibers are thereby sufficiently incorporated with the fabric to prevent their being easily removed therefrom.

Instead of moving the fleece-carrier away from the needles in such a manner as to entirely separate the fibers hung upon the needles from the web of fleece, as in the machine described, the said carrier may be moved downwardly from the needles a sufficient distance only to draw the fleece downwardly into the hooks thereof, and not far enough away from the needles to separate the fibers placed upon the needles from those held in said carrier. When moved in this manner, the carrier continuously hooks new portions of the fleece upon the needles, and such fleece is thereby incorporated with the fabric in a continuous or unbroken web.

An important advantage is derived from the use of the vertically-movable hooked sinkers I in connection with a series of horizontal needles and devices for feeding fleece-fibers to the needle-hooks. This advantage arises from the fact that by the use of said sinkers the devices for holding and feeding downward the upper edge of the fabric are supported and operate at the rear of the points upon the needles at which the stitches are formed, so that the operation of the fleece-feeding devices is not in any way interfered with by the devices mentioned, as would be the case if such devices were located forward of the fabric being formed upon the needles.

In order to provide means for adjusting the length of the stitches in the knitting mechanism described, means are provided for adjusting the length of the arms $D^2$, which connect the needle-bar D with the cams $C^3$, so that the hooks $b$ of the needles may be carried to a greater or less distance to the rear of the front edges of the sinkers I in their rearward movement, and the length of the loops (which are formed during such rearward motion, as shown in Fig. 27) thereby varied as desired. As shown in the drawings, the arm $D^2$ is, for this purpose, made in two parts, which are longitudinally adjustable one upon the other, and secured together by a nut, $d^5$, a rib, $d^6$, being formed upon one part, which fits into a corresponding groove in the other part, so as to retain them in alignment when moved.

The adjustment of the needle-bar last described necessarily varies the position of the hooked ends of the needles at the forward limit of their movement; and in order to provide means for an adjustment of such hooked ends with reference to the parts with which they co-operate when advanced, the groove $d$ in the needle-bar D, with which the heels $b^2$ of the needles are engaged, is made of considerable width, and in such groove, and resting against the rear surface of said heels, is placed a longitudinal bar, $D^4$, which is free to slide laterally therein, and is adjustably held by a number of thumb-screws, $d^4$, as shown. The several needles, during the reciprocation of the needle-bar, are carried forward in the grooves $a$ by the contact of the heels $b^2$ thereof with the bar $D^4$, and are carried backward by the contact of the said heels with the forward margin of the groove $d$, as shown more clearly in Fig. 2. The limits of the forward and rearward movement of the needles are thus controlled by the adjustment of the bar $D^4$ and arm $D^2$, respectively, there being more or less play or lost motion between the needles and needle-bar dependent upon the distance of the front edge of the bar $D^4$ from the front margin of the groove $d$, as shown.

The end plates, A, of the machine are shown as secured upon the edge of a bench or other projection by means of horizontal slots and clamping-screws in the lower rear portions of the said plates; but other means of supporting the machine may be used, as desired.

By incorporating the fleece-fibers in a knitted fabric composed of a number of threads, as described, a superior product is obtained, for the reason that the structure of such fabric, in which the opposite loops of each thread are interlocked with corresponding loops in the adjacent threads, is particularly adapted to hold the fibers securely in place.

I claim as my invention—

1. The combination, with the fabric-forming devices of a knitting-machine, of fleece-feeding mechanism constructed to incorporate loose or unspun fibers with the fabric while being knitted, and means constructed to actuate the fleece-feeding mechanism, having operative connection with the fabric-forming devices, whereby said fleece-feeding mechanism is operated automatically in connection with said fabric-forming devices, substantially as described.

2. The combination, with the fabric-forming devices of a knitting-machine, embracing hooked needles, of fleece-feeding mechanism constructed to deposit loose fibers upon the needle-hooks, and suitable driving-connections between the fabric-forming devices and the fleece-feeding mechanism, whereby the latter is operated automatically in connection with said fabric-forming devices, substantially as and for the purpose set forth.

3. The combination, with the fabric-forming devices of a knitting-machine, embracing hooked needles, of a fleece-carrier constructed to hold a web or body of fleece-fibers in position to be engaged by the needles, and mechanism constructed to move said carrier, whereby a portion of the fleece-fibers are deposited upon the hooks of said needles, substantially as and for the purpose set forth.

4. The combination, with the fabric-forming mechanism of a knitting-machine, embracing hooked needles, of a fleece-carrier constructed to present a body of fleece-fibers in position to be engaged by the needles, mechanism constructed to move the fleece-carrier, and means for feeding the body of fibers forward in the carrier as portions thereof are deposited upon the needles, substantially as described.

5. The combination, with the fabric-forming devices of a knitting-machine, embracing a row of hooked needles, of a fleece-carrier having two parallel parts or jaws constructed to hold a flat mass of fleece-fibers, mechanism constructed to move the fleece-carrier toward the needles, means for moving the carrier laterally away from the needles, and means for feeding the said mass forward in the carrier, substantially as and for the purpose set forth.

6. The combination, with the fabric-forming devices of a knitting-machine, embracing a row of hooked needles, of a device for holding the fleece, comprising a fleece-plate, $J'$, and a series of fingers, K, arranged opposite the spaces between the needles and projecting above the said fleece-plate $J'$, substantially as and for the purpose set forth.

7. The combination, with the fabric-forming devices of a knitting-machine, embracing a row of hooked needles, of a fleece-holder comprising a fleece-plate, $J'$, and a series of fingers, K, a series of feed-fingers, L, and means for moving said feed-fingers laterally and vertically, whereby the fleece-web is periodically advanced in the holder, substantially as described.

8. The combination, with the fabric-forming devices of a knitting-machine, embracing a series of reciprocating hooked needles, of a fleece-carrier, mechanism constructed to reciprocate the carrier, and means constructed to advance the fleece to the needles, when the latter are at the forward portion of their movement, substantially as described.

9. The combination, with the fabric-forming devices of a knitting-machine, embracing a series of horizontally-reciprocating hooked needles, of the frame provided with grooves N, pivoted dog $N'$, located in the grooves, a fleece-carrier provided with supporting-arms $J^2$, constructed to engage the grooves N and dogs $N'$, and means for horizontally reciprocating said fleece-carrier, substantially as described.

10. The combination, with the needles of a knitting-machine, and with the machine-frame provided with cam-grooves N, having inclined lower surfaces, $n'$ and $n^2$, of dogs $N'$, pivoted in said grooves and provided with upturned ends $n^3$, a fleece-carrier provided with supporting-arms $J^2$, constructed to engage said grooves and dogs, and means for reciprocating said fleece-carrier, substantially as and for the purpose set forth.

11. The combination, with the needles of a knitting-machine, and the machine-frame provided with stationary cam-surfaces $q$, $q'$ and $q^2$, and a laterally-reciprocating fleece-holder constructed to support the fleece in position to be engaged by the needles, of a vertically movable and rotatable bar, $L'$, mounted upon said holder, said bar being provided with a series of feed-fingers, L, and constructed to engage the cam-surfaces $q$ at its ends, arms $L^2$ upon the bar $L'$, provided with pins $l^2$, constructed to engage the cam-surfaces $q'$ and $q^2$, and a spring constructed to retain the said bar at one of the limits of both its reciprocatory and oscillatory movement, substantially as and for the purpose set forth.

12. The combination, with the needles of a knitting-machine, a machine-frame provided with cam-grooves N and dogs $N'$, and with projections $Q'$, having cam-surfaces $q$ and $q^3$, of a fleece-holder provided with supporting-arms $J^2$, constructed to engage the said cam-grooves and dogs, means for reciprocating said fleece-holder, a vertically movable and rotatable bar, $L'$, mounted in said holder, and provided with feed-fingers L and arms $L^2$, having pins $l^2$, a pivoted dog, $Q^2$, provided with cam-surfaces $q'$ and $q^2$, and a supporting-pin, $q^8$, substantially as and for the purpose set forth.

13. The combination, with the machine-frame, a laterally-reciprocating fleece-holder, and a vertically movable and rotatable feed-finger bar, $L'$, mounted upon said holder, and provided with an arm, $L^2$, having a pin, $l^2$, upon its end, of a plate, Q, provided with cam-surfaces $q$ and $q^3$, means for adjusting said plate vertically, a dog, $Q^2$, pivoted to said plate, and provided with cam-surfaces $q'$ and $q^2$, and a pin, $q^3$, secured to said plate Q, and vertically adjustable thereon, substantially as and for the purpose set forth.

14. In combination with the fleece-plate $J'$ of a fleece-carrier, and a fleece-feeding device operating in connection with said plate, an endless apron or band, R, extending over the fleece-plate, substantially as described.

15. In combination with the fleece-plate J' of a fleece-carrier, an endless apron, R, a roller, R', placed in the lower fold of said apron, guides R² for said rollers, and means for moving the apron, substantially as and for the purpose set forth.

16. In combination with a series of reciprocating hooked needles, means for operating said needles, and the machine-frame provided with cam-grooves N and stationary guides A², a reciprocating fleece-carrier provided with supporting-arms J², constructed to engage said cam-grooves, arms O, rigidly attached to said fleece-carrier, and provided with guide-slots o', constructed to engage said guides A², and means for actuating said arm, substantially as described.

17. In combination with the needles of a knitting-machine, and a fleece-carrier, arms O, connected with said fleece-carrier, means for adjusting the length of said arms, and means connected with the ends of the arms remote from the fleece-carrier, for reciprocating the latter, substantially as described.

18. In combination with a series of reciprocating hooked needles, and the machine-frame provided with cam-grooves N, a fleece-carrier provided with supporting-arms J², constructed to engage said cam-grooves, arms O, attached to said fleece-carrier, and provided with slots o, having central forwardly-deflected portions, o⁴, wheels having crank-pins engaged with the slots o, and suitable means for actuating the said wheels, substantially as described.

19. In combination with the fleece-plate J', a bar, K', provided with a series of guide-fingers, K, and means for adjusting said bar K' with reference to said plate, substantially as described.

20. The combination, with the fleece-plate J' and guide-finger bar K', of plates M, secured to the ends of the bar K', and pivotally connected at their upper ends with the said fleece-plate, and means for holding the lower ends of said plate in position with reference to said fleece-plate, substantially as described.

21. The combination, with the fleece-plate J', provided with arms j, and with the guide-finger bar K', of the plates M, rigidly attached to said bar, pivoted to said arms j, and provided with depending arms M', and means for adjustably and removably securing the lower ends of said arms to a part belonging to said fleece-plate, substantially as described.

22. The combination, with a series of needles, B, the fleece-plate J', and the bar K', provided with guide-fingers K, of plates M, rigidly secured to the ends of said bar K', and provided with vertical slots m, a bar, L', provided with feed-fingers L, and having cylindrical ends constructed to enter the slots m, a spring or springs, L⁴, secured to the plates M, and constructed to throw the said bar L' upward and the ends of the feed-fingers toward the fleece-plate, and means operated by the movement of the carrier for reciprocating and rotating said bar L' in opposition to the action of said spring or springs, substantially as described.

23. The combination, with a series of horizontal reciprocating hooked and latched needles, a series of suitably-actuated thread-carriers, and a series of hooked sinkers, I, constructed to move in a direction transverse to the needles, of fleece-feeding mechanism constructed to deposit loose fibers upon the needle-hooks, and means for operating said fleece-feeding mechanism, substantially as described.

24. In combination with the machine-frame, provided with vertical guides I², a series of reciprocating hooked and latched needles, a series of movable thread-carriers, a main driving-shaft, C, and suitable connections for operating said needles and thread-carriers from said shaft, a sinker-bar, I', provided with sinkers I, and supported in said vertical guides, a cam-plate, C⁶, having a cam-groove, c⁶, and secured upon said shaft C, and a centrally-pivoted lever, I³, engaged at one end with said cam-plate, and connected at the other end with said sinker-bar, substantially as and for the purpose set forth.

25. In combination with a series of reciprocating hooked needles provided with latches b', a vertically-movable rod, I⁴, constructed to prevent the closing of the latches during the forward movement of the needles, and means for reciprocating said rod, substantially as described.

26. In combination with a series of reciprocating hooked needles provided with latches b', a series of thread-carriers, and a reciprocating sinker-bar provided with a series of sinkers, a rod, I⁴, secured to said sinker-bar, substantially as and for the purpose set forth.

CHARLES YOUNG.

Witnesses:
   J. S. SMITH,
   FRED J. HUBBARD.